United States Patent
Hanawa et al.

(10) Patent No.: US 6,727,010 B2
(45) Date of Patent: Apr. 27, 2004

(54) MAGNETIC RECORDING MEDIUM, PRODUCTION PROCESS THEREOF, MAGNETIC RECORDING AND REPRODUCING APPARATUS, AND MEDIUM SUBSTRATE

(75) Inventors: Kenzo Hanawa, Chiba (JP); Hiroshi Ohsawa, Chiba (JP)

(73) Assignee: Showa Denko Kabushiki Kaisha, Tokyo (JP)

( * ) Notice: Subject to any disclaimer, the term of this patent is extended or adjusted under 35 U.S.C. 154(b) by 131 days.

(21) Appl. No.: 10/026,842

(22) Filed: Dec. 27, 2001

(65) Prior Publication Data

US 2002/0122960 A1 Sep. 5, 2002

Related U.S. Application Data

(60) Provisional application No. 60/268,906, filed on Feb. 16, 2001.

(30) Foreign Application Priority Data

Dec. 27, 2000 (JP) ........................................ 2000-399398

(51) Int. Cl.$^7$ .............................. G11B 5/66; G11B 5/70; B32B 13/00; B05D 5/12

(52) U.S. Cl. ................. 428/694 TS; 428/336; 428/611; 428/667; 428/680; 428/900; 427/131; 427/132

(58) Field of Search ........................... 428/694 TS, 336, 428/611, 667, 680, 900; 427/131, 132

(56) References Cited

U.S. PATENT DOCUMENTS

| | | | |
|---|---|---|---|
| 5,302,434 A | * | 4/1994 | Doerner et al. ............. 428/65.6 |
| 5,700,593 A | * | 12/1997 | Okumura et al. ........ 428/694 TS |
| 6,150,016 A | * | 11/2000 | Song et al. .................. 428/332 |
| 6,524,724 B1 | * | 2/2003 | Cheng et al. ................ 428/611 |

* cited by examiner

*Primary Examiner*—Holly Rickman
(74) *Attorney, Agent, or Firm*—Sughrue Mion, PLLC (57) ABSTRACT

A magnetic recording medium comprising, in order, a non-metallic substrate; an amorphous metallic film having an amorphous structure; a crystal-structure-regulating film of NiP-based alloy; and a non-magnetic undercoat film and a magnetic film; and wherein the crystal-structure-regulating film has a film thickness of 50 nm or less, and a total film thickness of the amorphous metallic film and the crystal-structure-regulating film is at least 60 nm is disclosed.

7 Claims, 4 Drawing Sheets

MAGNETIC RECORDING MEDIUM, PRODUCTION PROCESS THEREOF, MAGNETIC RECORDING AND REPRODUCING APPARATUS, AND MEDIUM SUBSTRATE

CROSS REFERENCE TO RELATED APPLICATIONS

This application is an application filed under 35 U.S.C. §111(a) claiming benefit pursuant to 35 U.S.C. §119(e)(1) of the filing date of Provisional Application 60/268,906 filed Feb. 16, 2001 pursuant to 35 U.S.C. §111(b).

FIELD OF THE INVENTION

The present invention relates to a magnetic recording medium used in an apparatus such as a magnetic disk apparatus; to a process for producing the magnetic recording medium; to a magnetic recording and reproducing apparatus including the magnetic recording medium; and to a medium substrate used in the magnetic recording medium.

BACKGROUND OF THE INVENTION

Hitherto, typical magnetic recording media have a structure including a substrate formed from a metal such as aluminum, an NiP-based-alloy film formed on the substrate, and a non-magnetic undercoat film and a magnetic film formed on the NiP-based alloy film, where the alloy film is textured to impart anisotropy to the magnetic film.

In recent years, as substrates for producing magnetic recording media, non-metallic substrates formed from a material such as glass have substituted for metallic substrates. Non-metallic substrates have an advantage in that they do not easily permit head slap to occur, because of their high hardness. In addition, from the viewpoint of glide height characteristics, non-metallic substrates are advantageous, because of their high surface evenness. However, non-metallic substrates are difficult to texture. Therefore, it has been proposed that an NiP-based-alloy film be formed on the surface of a non-metallic substrate, and that the surface of the alloy film be subjected to texturing.

An NiP-based-alloy film is formed through electroless plating or sputtering.

Although an NiP-based-alloy film formed through electroless plating has high hardness and exhibits excellent durability, the film also has a problem in that the production process for the film is intricate. Therefore, in order to produce an NiP-based-alloy film, sputtering is typically employed in view of its excellent production efficiency.

However, since an NiP-based-alloy film formed through sputtering has a hardness lower than that of an NiP-based-alloy film formed through electroless plating, when the sputtered film is subjected to texturing, burrs are easily formed on its surface, and abrasive grains are easily left on the surface. Particularly, when the thickness of the sputtered film is large, the surface configuration of the film tends to become non-uniform, potentially resulting in unsatisfactory glide height characteristics.

In order to enhance glide height characteristics effectively, the thickness of an NiP-based-alloy film is reduced, thereby causing the surface configuration of the film to become uniform.

However, when an NiP-based-alloy film is formed to be thin, application of bias to the film becomes difficult during formation of a non-magnetic undercoat film and a magnetic film, and thus the crystal structure of the films formed is impaired. As a result, the crystal orientation of the non-magnetic undercoat film and the magnetic film is impaired, potentially causing deterioration of magnetic characteristics such as noise characteristics.

It has been considered that, even when an NiP-based-alloy film is thin, if a thick metallic film formed from, for example, Cr is provided between the alloy film and a substrate, bias can be easily applied to the alloy film during formation of a non-magnetic undercoat film and a magnetic film.

However, in this case, since crystal growth of the thick metallic film proceeds excessively, the non-magnetic undercoat film which is formed on the thin NiP-based-alloy film, which is formed on the metallic film, is affected strongly by the crystallinity of the metallic film. Therefore, the crystal orientation of the non-magnetic undercoat film is impaired, potentially causing deterioration of magnetic characteristics such as noise characteristics.

In order to subject an NiP-based-alloy film to effective texturing, the NiP-based-alloy film can be formed from an alloy of NiP containing an element such as Mo, to increase the hardness of the film.

When an NiP-based-alloy film is formed from the aforementioned alloy, even if the thickness of the alloy film is increased in consideration of bias application during formation of a non-magnetic undercoat film and a magnetic film, good—to some extent—texturing-related properties can be ensured. However, even in this case, it is currently difficult to obtain satisfactory glide height characteristics to attain high recording density.

SUMMARY OF THE INVENTION

In view of the foregoing, an object of the present invention is to provide a magnetic recording medium which exhibits excellent glide height characteristics and excellent magnetic characteristics such as noise characteristics.

Another object of the present invention is to provide a process for producing the medium.

Still another object of the present invention is to provide a magnetic recording and reproducing apparatus.

A further object of the present invention is to provide a substrate used in the medium.

The present invention provides a magnetic recording medium comprising, in order, a non-metallic substrate an amorphous metallic film having an amorphous structure, a crystal-structure-regulating film, a non-magnetic undercoat film and a magnetic film, and wherein the thickness of the crystal-structure-regulating film is 50 nm or less, and the total thickness of the amorphous metallic film and the crystal-structure-regulating film is at least 60 nm.

Preferably, the amorphous metallic film is formed from one or more elements selected from among Cr, Co, Ta, Nb, Si, Al, Ti, Zr, W, and Mo.

Preferably, the amorphous metallic film is formed from a CrTa-based alloy or a CrSi-based alloy.

The crystal-structure-regulating film preferably has an average surface roughness (Ra) of 0.5 nm or less, more preferably 0.05–0.5 nm.

Preferably, the P content of the NiP-based alloy constituting the crystal-structure-regulating film is 15–25 at %.

The present invention also provides a process for producing a magnetic recording medium, which comprises forming, on a non-metallic substrate, an amorphous metallic film, a crystal-structure-regulating film, a non-magnetic undercoat film, and a magnetic film, in order, and wherein the thickness of the crystal-structure-regulating film is 50 nm or less, and the total thickness of the amorphous metallic film and the crystal-structure-regulating film is at least 60 nm.

The present invention also provides a magnetic recording and reproducing apparatus comprising a magnetic recording medium and a magnetic head for recording data onto the medium and reproducing the data therefrom, wherein the magnetic recording medium comprises a non-metallic substrate; a crystal-structure-regulating film of NiP-based alloy formed thereon; and a non-magnetic undercoat film and a magnetic film formed on the crystal-structure-regulating film; with an amorphous metallic film having an amorphous structure provided between the non-metallic substrate and the crystal-structure-regulating film, and wherein the thickness of the crystal-structure-regulating film is 50 nm or less, and the total thickness of the amorphous metallic film and the crystal-structure-regulating film is at least 60 nm.

The present invention further provides a medium substrate comprising a non-metallic substrate; an amorphous metallic film having an amorphous structure provided thereon; and a crystal-structure-regulating film of NiP-based alloy formed on the amorphous metallic film, and wherein the thickness of the crystal-structure-regulating film is 50 nm or less, and the total thickness of the amorphous metallic film and the crystal-structure-regulating film is at least 60 nm.

DESCRIPTION OF THE PREFERRED EMBODIMENTS

Figure 1:
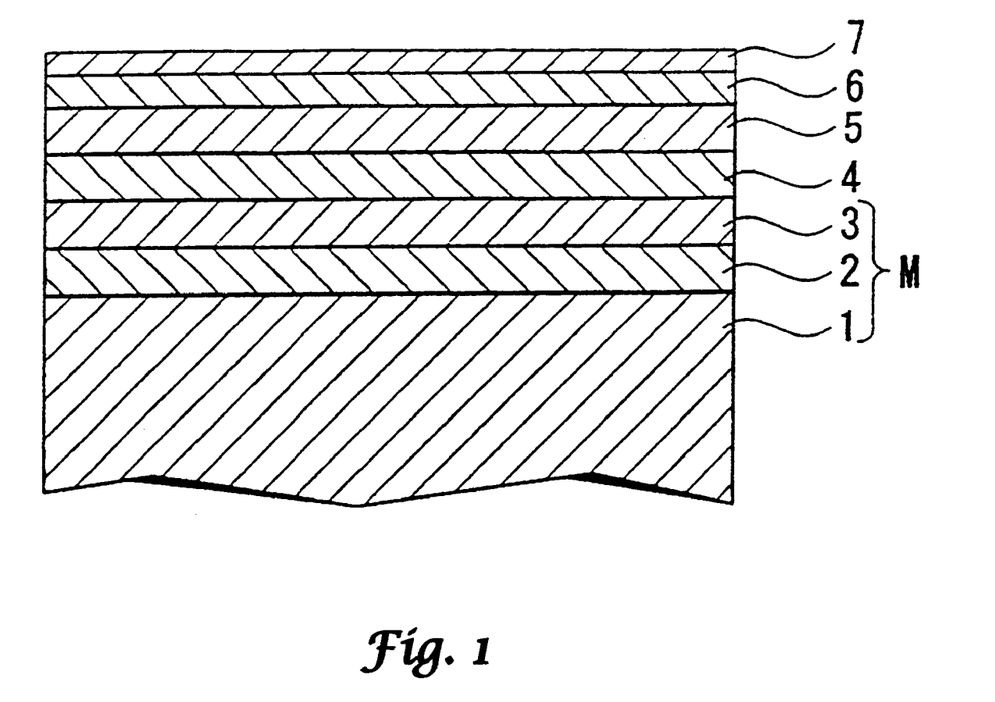
FIG. 1 is a partial cross-sectional view showing a first embodiment of the magnetic recording medium of the present invention.

FIG. 1 shows a first embodiment of the magnetic recording medium of the present invention. The magnetic recording medium includes a non-metallic substrate 1, an amorphous metallic film 2, a crystal-structure-regulating film 3, a non-magnetic undercoat film 4, a magnetic film 5, a protective film 6, and a lubrication film 7. The films 2 to 7 are successively formed on the substrate 1.

Hereinafter, the structure containing the non-metallic substrate 1, along with the amorphous metallic film 2 and the crystal-structure-regulating film 3 which are formed on the substrate 1, will be called a medium substrate M.

The non-magnetic substrate 1 is a substrate formed from a non-metallic material such as glass, ceramic, silicon, silicon carbide, or carbon.

A glass substrate may be formed from amorphous glass or glass ceramic. The amorphous glass may be widely-used soda-lime glass, or aluminosilicate glass. The glass ceramic may be a lithium-based glass ceramic.

Meanwhile, a ceramic substrate may be a widely-used sintered compact predominantly containing, for example, aluminum oxide, aluminum nitride, or silicon nitride; or fiber-reinforced material thereof.

The amorphous metallic film 2 is formed from a metallic material having an amorphous structure. The metallic material may be one or more elements selected from among Cr, Co, Ta, Nb, Si, Al, Ti, Zr, W, and Mo.

Particularly, a CrTa-based alloy or a CrSi-based alloy is preferably used.

The CrTa-based alloy may be CrTa or an alloy containing CrTa and other elements (for example, one or more elements selected from among Co, Nb, Si, Al, Ti, Zr, W, and Mo). The Ta content is preferably 30–70 at %, more preferably 30–50 at %. When the Ta content falls outside the above range, the amorphous structure may be impaired.

The CrSi-based alloy may be CrSi or an alloy containing CrSi and other elements (for example, one or more elements selected from among Co, Ta, Nb, Al, Ti, Zr, W, and Mo). The Si content is preferably 20–99 at %, more preferably 25–95 at %. When the Si content falls outside the above range, the amorphous structure may be impaired.

The amorphous metallic film 2 may be formed from a CoCrZr-based alloy, a CoTaZr-based alloy, or a CoSiZr-based alloy.

The thickness of the amorphous metallic film 2 is preferably 30–200 nm, more preferably 50–170 nm, and still more preferably 60–140 nm.

When the thickness of the amorphous metallic film 2 falls below the above range, during formation of the non-magnetic undercoat film or the magnetic film on the amorphous metallic film 2, bias applied to the disk on which the film is to be formed becomes insufficient, resulting in deterioration of magnetic characteristics. In contrast, when the thickness of the amorphous metallic film 2 exceeds the above range, film formation efficiency is lowered.

The amorphous metallic film 2 serves as a conductive film for facilitating application of bias during formation of the non-magnetic undercoat film 4 and the magnetic film 5. The amorphous metallic film 2 also serves as a bonding-strengthening film for enhancing the strength of bonding between the non-metallic substrate 1 and the crystal-structure-regulating film 3.

The crystal-structure-regulating film 3 has a function of regulating the crystal-structure of a film provided directly on the film 3, and the film 3 is formed from an NiP-based alloy.

The NiP-based alloy may be NiP; or an alloy containing NiP and other elements (e.g., one or more elements selected from among Cr, Mo, Si, Mn, W, Nb, Ti, and Zr), so long as such "other elements" do not adversely affect crystal growth of the non-magnetic undercoat film 4.

The P content of the NiP-based alloy constituting the crystal-structure-regulating film 3 is preferably 15–25 at %, more preferably 16–24 at %, and still more preferably 17–20 at %.

When the P content falls below the above range, the NiP-based alloy is easily crystallized, and the film 3 adversely affects the crystal orientation of the non-magnetic undercoat film 4 and the magnetic film 5 and may cause deterioration of magnetic characteristics such as noise characteristics.

In contrast, when the P content exceeds the above range, texturing efficiency is lowered, and the crystal orientation of the non-magnetic undercoat film 4 in a circumferential direction becomes unsatisfactory, and, therefore, imparting magnetic anisotropy to the magnetic film 5 tends to become difficult.

The thickness of the crystal-structure-regulating film 3 is 50 nm or less, preferably 40 nm or less, and more preferably 30 nm or less.

When the thickness of the film 3 exceeds the above range, texturing of the film easily induces formation of burrs or abrasive grains remaining on the film, resulting in deterioration of glide height characteristics.

The thickness of the crystal-structure-regulating film 3 is preferably 1 nm or more.

When the thickness of the film 3 falls below the above range, texturing efficiency is lowered, and, therefore, imparting crystal orientation to the non-magnetic undercoat film 4 in a circumferential direction tends to become difficult.

The crystal-structure-regulating film 3 is subjected to texturing such as mechanical texturing. Preferably, texture lines (scratches) formed on the film 3 through texturing run substantially along the circumferential direction of the substrate.

The average surface roughness (Ra) of the crystal-structure-regulating film 3 is preferably 0.5 nm or less, more preferably 0.3 nm or less. When the average surface roughness (Ra) exceeds the above range, the evenness of the medium is lowered, resulting in poor glide height characteristics.

The average surface roughness (Ra) of the crystal-structure-regulating film 3 is preferably 0.05 nm or more. When the average surface roughness (Ra) falls below the above range, the crystal-structure-regulating film 3 becomes excessively even, and the surface evenness of the magnetic recording medium becomes excessively high, potentially causing adsorption of a magnetic head onto the medium during recording and reproduction of data.

The maximum protrusion height (Rp) of the crystal-structure-regulating film 3 is preferably 10 nm or less, more preferably 5 nm or less.

In the magnetic recording medium according to the first embodiment, the total thickness of the amorphous metallic film 2 and the crystal-structure-regulating film 3 is 60 nm or more, preferably 70 nm or more, and more preferably 80 nm or more.

When the total thickness falls below the above range, during formation of a film on the crystal-structure-regulating film 3, bias applied to the disk on which a film is to be formed becomes insufficient, resulting in deterioration of magnetic characteristics such as noise characteristics.

When bias is sufficiently applied, a phenomenon that Ni contained in the crystal-structure-regulating film 3 precipitates on the surface of the magnetic recording medium can be prevented (i.e., Ni corrosion phenomenon can be prevented).

The aforementioned total thickness is preferably 200 nm or less, more preferably 180 nm or less, much more preferably 150 nm or less.

When the total thickness exceeds the above range, film formation efficiency is lowered, and the surface evenness of the crystal-structure-regulating film 3 is easily lowered.

The non-magnetic undercoat film 4 may be formed from conventionally known materials for an undercoat film, such as one or more elements selected from among Cr, Ti, Ni, Si, Ta, W, Mo, V, and Nb.

Particularly, the film 4 is preferably formed from Cr or a Cr alloy (e.g., a CrTi—, CrW—, CrMo—, or CrV-based alloy).

The thickness of the non-magnetic undercoat film 4 is preferably 1–100 nm, more preferably 2–50 nm.

The magnetic film 5 is preferably formed from a magnetic material containing Co. The material may be, for example, a Co alloy containing Co and one or more elements selected from among Cr, Pt, Ta, B, Ti, Ag, Cu, Al, Au, W, Nb, Zr, V, Ni, Fe, and Mo.

Preferred specific examples of the above material include CoCr—, CoPt—, CoCrPt—, CoCrPtTa—, CoCrPtB—, CoCrPtBTa—, CoCrPtTaCu—, CoCrPtTaZr—, CoCrPtTaW—, CoCrPtCu—, CoCrPtZr—, CoCrPtBCu—, CoCrPtBZr—, CoNiTa—, CoNiTaCr—, and CoCrTa-based alloys.

The thickness of the magnetic film 5 is preferably 3–100 nm, more preferably 10–30 nm.

The protective film 6 may be formed from conventionally known materials. For example, the film 6 may be formed from a material containing a single component such as carbon, silicon oxide, silicon nitride, or zirconium oxide; or from a material predominantly containing such components.

The thickness of the protective film 6 is preferably 2–10 nm.

The lubrication film 7 may be formed from a fluorine-containing lubricant such as perfluoropolyether.

An embodiment of the production process for a magnetic recording medium of the present invention will next be described by taking the production of the aforementioned magnetic recording medium as an example.

Firstly, the amorphous metallic film 2 is formed on the non-metallic substrate 1 through, for example, sputtering.

Preferably, the amorphous metallic film 2 is formed at a temperature of 100° C. or lower, preferably 80° C. or lower.

When the temperature exceeds the above range, the amorphous metallic film 2 encounters difficulty in assuming an amorphous structure, and thus the film 2 adversely affects the crystal orientation of the non-magnetic undercoat film 4 and the magnetic film 5, potentially causing deterioration of noise characteristics. For example, when the non-magnetic undercoat film 4 is formed from Cr, the crystal orientation plane of Cr assumes a (110) plane, potentially resulting in deterioration of noise characteristics.

Subsequently, crystal-structure-regulating film 3 is formed on the amorphous metallic film 2 through, for example, sputtering. The thickness of the crystal-structure-regulating film 3 is determined at 50 nm or less.

The thickness of the crystal-structure-regulating film 3 is determined such that the total thickness of the amorphous metallic film 2 and the crystal-structure-regulating film 3 becomes 60 nm or more.

The surface of the crystal-structure-regulating film 3 is subjected to texturing, such as mechanical texturing by use of a lapping tape containing fixed abrasive grains or by use of free abrasive grains.

Abrasive grains having an average grain size of 100–500 nm may be used for texturing.

During texturing, the amount of texturing (i.e., the thickness of a portion of the film 3 to be scraped off through texturing) is preferably determined at, for example, about 10 nm.

Therefore, when the crystal-structure-regulating film 3 is formed, the material of the film 3 is deposited onto the amorphous metallic film 2 such that the resultant film 3 assumes a thickness slightly (e.g., about 10 nm) larger than its target thickness, and the film 3 is subjected to texturing to attain the target thickness.

As described above, when an extra portion for texturing (i.e., a portion to be scraped off through texturing) is provided in consideration of the amount of texturing, uniform and sufficient texturing can be realized.

A specific process for texturing will next be described.

Figure 2A:
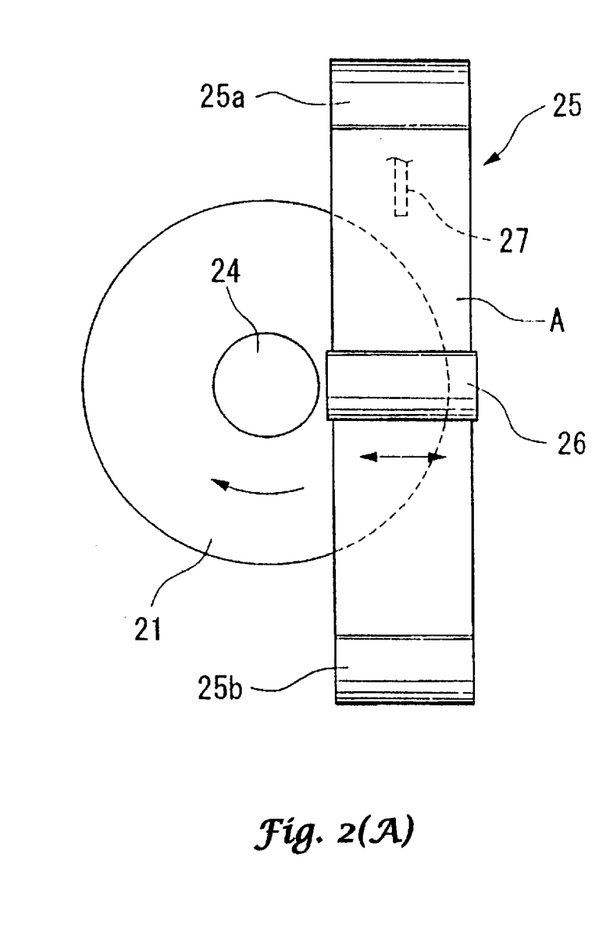
FIG. 2(A) is a schematic representation showing a side view of a texturing apparatus which can be employed for producing the magnetic recording medium shown in FIG. 1.
Figure 2B:
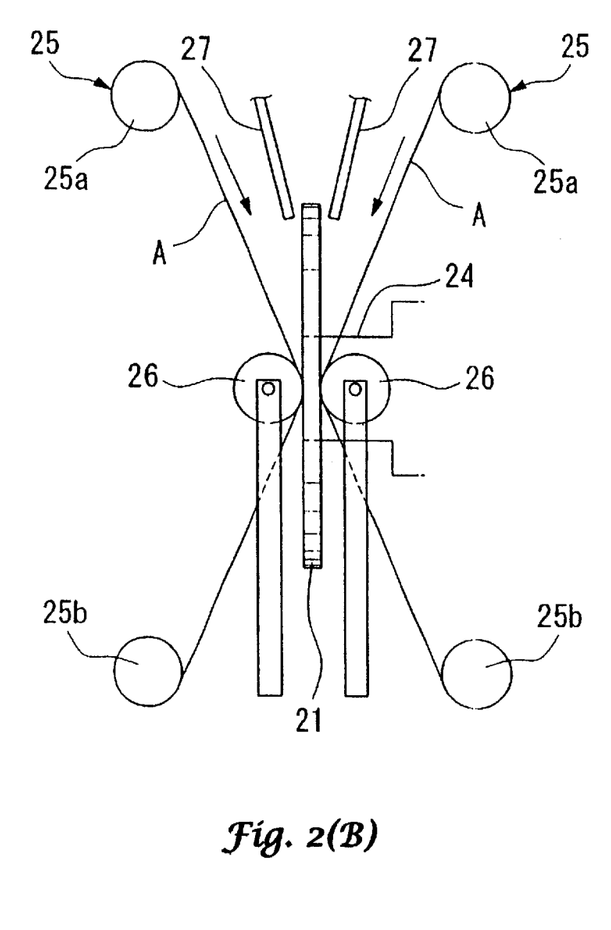
FIG. 2(B) is a schematic representation showing a front view of a texturing apparatus which can be employed for producing the magnetic recording medium shown in FIG. 1.

FIGS. 2(A) and 2(B) shows a texturing apparatus for subjecting the crystal-structure-regulating film 3 to texturing. The texturing apparatus shown in FIG. 2 includes a substrate support section 24 for supporting a disk 21 (including the non-metallic substrate 1, and the amorphous metallic film 2 and the crystal-structure-regulating film 3 which are formed on the substrate 1) so that the disk can rotate; abrasive tape feeding sections 25, 25 for feeding of abrasive tapes A for mechanically polishing the disk 21; contact rollers 26, 26 for pressing the abrasive tapes A onto a portion of the surface of the disk 21; and abrasive grain feeding nozzles 27, 27 for feeding abrasive grains to contact portions between the abrasive tapes A and the disk 21.

The abrasive tape feeding section 25 is constructed such that the abrasive tape A (e.g., a widely used polishing tape) wound around a feeding role 25a travels in a direction perpendicular to the radial direction of a portion of the disk 21 with which the abrasive tape A comes into contact, and the tape A can be taken up by a take-up roll 25b at an arbitrary speed. The abrasive tape feeding sections 25 are provided to face the surfaces of the disk 21.

Preferably, the abrasive tape feeding section 25 is provided so that the abrasive tape A can be reciprocated by means of a non-illustrated reciprocating mechanism in a direction substantially perpendicular to the travel direction of the tape.

In order to subject the disk 21 to texturing by means of the texturing apparatus, the disk 21 is supported by the substrate support section 24, and while the disk 21 is rotated, the abrasive tape A set on the abrasive tape feeding section 25 is taken up by the take-up roll 25b.

The rotation rate of the disk 21 is preferably 50–3,500 rpm, more preferably 100–1,200 rpm. The take-up rate of the abrasive tape A is preferably 1–10 mm/second.

When the abrasive tape A passes between the contact roller 26 and the disk 21, the tape runs on the disk 21 while maintaining contact with the surface of the disk 21.

The pressure for pressing the contact roller 26 is preferably 1–3 kg/cm$^2$.

Simultaneously, an abrasive slurry containing abrasive grains suspended in water is fed through the abrasive grain feeding nozzle 27 onto the abrasive tape A. The amount of abrasive grains contained in the abrasive slurry is preferably 0.01–1.0 wt. %.

The abrasive slurry fed through the abrasive feeding nozzle 27 reaches the contact portion between the abrasive tape A and the disk 21, and abrasive grains contained in the abrasive slurry are rubbed on the disk 21 by means of the abrasive tape A, which travels in a direction perpendicular to a radial direction of the disk 21, thereby scraping the surface of the disk 21. Through this texturing, texture lines which run along substantially the circumferential direction of the substrate are formed on the surface of the disk 21.

When the disk 21 is subjected to texturing, the abrasive tape A is preferably reciprocated in a direction perpendicular to the travel direction of the tape by means of the aforementioned reciprocating mechanism, to cause the surface configuration of the disk 21 to become uniform in a radial direction of the disk.

Texturing time is preferably 5–60 seconds.

After texturing, preferably, the surface of the crystal-structure-regulating film 3 is washed with water.

After texturing, preferably, the disk 21 is heated to subject the crystal-structure-regulating film 3 to heat treatment. This heat treatment can be carried out at 100–270° C.

Through this heat treatment, the crystal orientation of the non-magnetic undercoat film 4 and the magnetic film 5 can be enhanced.

Through the aforementioned procedure, the medium substrate M is produced such that the total thickness of the amorphous metallic film 2 and the crystal-structure-regulating film 3 is 60 nm or more.

Subsequently, the non-magnetic undercoat film 4 is formed on the crystal-structure-regulating film 3 through, for example, sputtering.

When the amorphous metallic film 2 is formed from one or more elements selected from among Cr, Co, Ta, Nb, Si, Al, Ti, Zr, W, and Mo (e.g., a CrTa-based alloy or a CrSi-based alloy), and the non-magnetic undercoat film 4 is formed from Cr (or a Cr alloy), the crystal orientation plane of the non-magnetic undercoat film 4 reliably assumes a (200) plane.

When the non-magnetic undercoat film 4 is formed through sputtering, bias is applied to the medium substrate M (including the non-metallic substrate 1, and the amorphous metallic film 2 and the crystal-structure-regulating film 3 which are formed on the substrate 1).

A process for application of bias will next be described with reference to a specific example.

Figure 3:
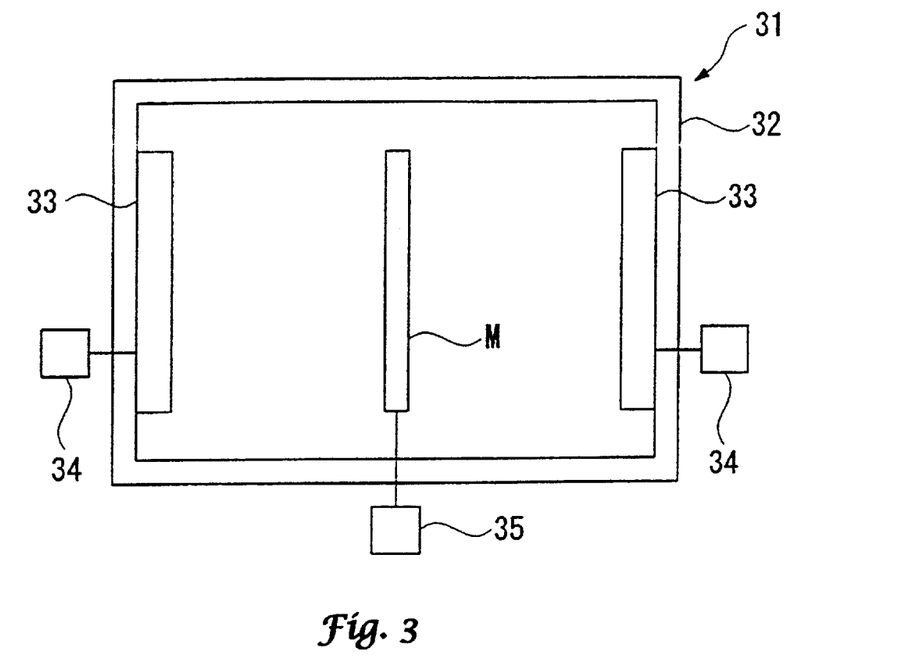
FIG. 3 is a schematic representation showing a sputtering apparatus which can be employed for producing the magnetic recording medium shown in FIG. 1.

FIG. 3 shows a sputtering apparatus. The sputtering apparatus 31 shown in FIG. 3 includes a chamber 32; targets 33 provided on inner walls of the chamber 32, the walls facing each other; power sources 34 for supplying power to the targets 33; and a bias power source 35 for applying bias to the medium substrate M.

When the non-magnetic undercoat film 4 is formed on the medium substrate M by use of the sputtering apparatus 31, power is supplied to the targets 33, to deposit the material of the targets 33 onto the medium substrate M through sputtering.

During sputtering, bias is applied to the medium substrate M using the bias power source 35.

The bias voltage applied is preferably 100–400 V, more preferably 300–400 V. When the bias voltage falls below the above range, the effect of enhancing the crystal orientation of a film to be formed is lowered, whereas when the bias voltage exceeds the above range, film formation efficiency is lowered.

Since the amorphous metallic film 2 and the crystal-structure-regulating film 3 are formed to sufficient thickness in the medium substrate M, the electrical resistance of the films 2 and 3 is low, and sufficient bias current flows through the films 2 and 3.

Therefore, the crystal orientation of the non-magnetic undercoat film 4 formed on the medium substrate M can be enhanced, and film formation efficiency can be enhanced.

Subsequently, the magnetic film 5 is formed on the non-magnetic undercoat film 4 through, for example, sputtering.

When the magnetic film 5 is formed, application of bias is carried out in a manner similar to the forming of the non-magnetic undercoat film 4.

Subsequently, the protective film 6 is formed on the magnetic film 5 through, for example, plasma CVD or sputtering.

Subsequently, the lubrication film 7 is formed on the protective film 6 through, for example, dipping.

Through the above-described procedure, the magnetic recording medium shown in FIG. 1 is produced.

In the magnetic recording medium according to the first embodiment of the present invention, since the amorphous metallic film 2 is provided between the non-metallic substrate 1 and the crystal-structure-regulating film 3, the amorphous metallic film 2 does not affect the crystallinity of the film formed on the film 2. Therefore, impairment of the crystal orientation of the non-magnetic undercoat film 4 can be prevented.

Since total thickness of the amorphous metallic film 2 and the crystal-structure-regulating film 3 is determined to be 60 nm or more, during formation of the non-magnetic undercoat film 4, the electrical resistance of the amorphous metallic film 2 and the crystal-structure-regulating film 3 is lowered, and there can be prevented insufficiency of bias applied to the disk on which the film 4 is to be formed. As a result, disturbance of crystal growth of the non-magnetic undercoat film 4 can be prevented, and the crystal orientation of the film 4 can be enhanced.

Therefore, the crystal orientation of the magnetic film 5 is enhanced, and excellent magnetic characteristics (e.g., noise characteristics) can be obtained.

In the magnetic recording medium, the thickness of the crystal-structure-regulating film 3 is determined to be 50 nm or less. Therefore, formation of burrs or the remaining of abrasive grains on the film 3 during texturing can be prevented, the surface evenness of the film 3 can be enhanced, and glide height characteristics can be enhanced.

In contrast, when the thickness of the crystal-structure-regulating film exceeds 50 nm, the thickness becomes sufficiently large with respect to the size of abrasive grains (e.g., 100–500 nm) which are used during texturing.

Therefore, when the abrasive grains are rubbed on the surface of the crystal-structure-regulating film, the abrasive grains deeply enter the film, and burrs are easily formed on the surface of the film. In addition, while entering the film, the abrasive grains tend to remain in the film. As a result, glide height characteristics are deteriorated easily.

As described above, the magnetic recording medium according to the first embodiment of the present invention exhibits excellent magnetic characteristics, such as noise characteristics, and excellent glide height characteristics.

In the production process of the aforementioned embodiment, the amorphous metallic film 2 is provided between the non-metallic substrate 1 and the crystal-structure-regulating film 3, the thickness of the crystal-structure-regulating film 3 is controlled to 50 nm or less, and the total thickness of the amorphous metallic film 2 and the crystal-structure-regulating film 3 is controlled to 60 nm or more. Therefore, a magnetic recording medium exhibiting excellent magnetic characteristics, such as noise characteristics, and excellent glide height characteristics can be produced.

In the medium substrate M used in the magnetic recording medium according to the first embodiment of the present invention, the amorphous metallic film 2 and the crystal-structure-regulating film 3 are provided on the non-metallic substrate 1, the thickness of the crystal-structure-regulating film 3 is controlled to 50 nm or less, and the total thickness of the amorphous metallic film 2 and the crystal-structure-regulating film 3 is controlled to 60 nm or more. Therefore, the magnetic recording medium exhibits excellent magnetic characteristics, such as noise characteristics, and excellent glide height characteristics.

When an extra portion for texturing is provided, the thickness of the crystal-structure-regulating film 3 before texturing is preferably 11 nm or more, more preferably 20 nm or more.

Figure 4:
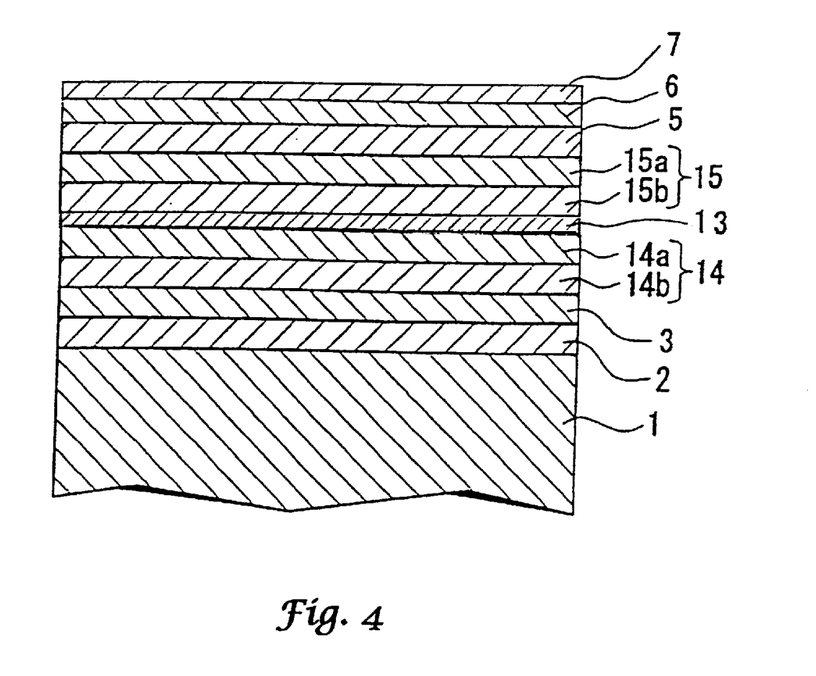
FIG. 4 is a partial cross-sectional view showing a second embodiment of the magnetic recording medium of the present invention.

FIG. 4 shows a second embodiment of the magnetic recording medium of the present invention. The magnetic recording medium includes a non-metallic substrate 1, an amorphous metallic film 2, a crystal-structure-regulating film 3, a non-magnetic undercoat film 14, an intermediate film 13, a magnetic film 15, a protective film 6, and a lubrication film 7. The films 1–7 are successively formed on the substrate 1.

The non-magnetic undercoat film 14 has a two-layer structure including a first undercoat layer 14a (upper layer) and a second undercoat layer 14b (lower layer). These undercoat layers 14a and 14b may be formed from a material similar to that of the non-magnetic undercoat film 4 of the magnetic recording medium according to the first embodiment of the present invention shown in FIG. 1.

The intermediate film 13 may be formed from, for example, a Co alloy containing Co and one or more elements selected from among Cr, Pt, Ta, B, Ti, Ag, Cu, Al, Au, W, Nb, Zr, V, Ni, Fe, and Mo.

Preferred specific examples of the above material include CoCr—, CoPt—, CoCrPt—, CoCrPtTa—, CoCrPtB—, CoCrPtBTa—, CoCrPtTaCu—, CoCrPtTaZr—, CoCrPtTaW—, CoCrPtCu—, CoCrPtZr—, CoCrPtBCu—, CoCrPtBZr—, CoNiTa—, CoNiTaCr—, and CoCrTa-based alloys.

The magnetic film 15 has a two-layer structure including a first magnetic layer 15a (upper layer) and a second magnetic layer 15b (lower layer). These magnetic layers 15a and 15b may be formed from a material similar to that of the magnetic film 5 of the magnetic recording medium according to the first embodiment shown in FIG. 1.

Figure 5:
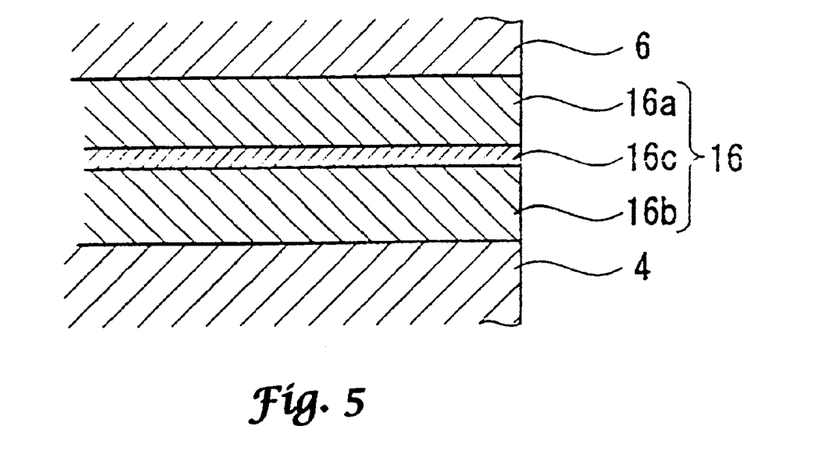
FIG. 5 is a partial cross-sectional view showing a third embodiment of the magnetic recording medium of the present invention.

In the present invention, the magnetic film may have an antiferromagnetic bonding structure shown in FIG. 5 (a so-called AFC (Anti Ferro-magnetic Coupling) structure).

A magnetic film 16 shown in FIG. 5 includes first and second magnetic layers 16a and 16b, and an intermediate layer 16c provided between these magnetic layers.

The first and second magnetic layers 16a and 16b may be formed from a material similar to that of the magnetic film 5 of the magnetic recording medium according to the first embodiment shown in FIG. 1.

The intermediate layer 16c may be formed from, for example, Ru.

The magnetic film 16 is formed such that, when the film 16 is magnetized, the magnetization direction of the first magnetic layer 16a becomes opposite or the same as that of the second magnetic layer 16b.

The thickness of the first magnetic layer 16a (upper layer) is preferably 1–10 nm.

The thickness of the second magnetic layer 16b (lower layer) is preferably 6–20 nm.

When the intermediate layer 16c is formed from Ru, the thickness of the layer 16c is preferably 0.6–1 nm, more preferably 0.7–0.9 nm.

When the magnetic film 16 has an AFC structure, thermal stability can be enhanced.

In the present invention, the structure of the magnetic film is not limited to the aforementioned structure. For example, the magnetic film may have a structure including three or more magnetic layers, in which an intermediate layer is provided between adjacent magnetic layers.

Figure 6:
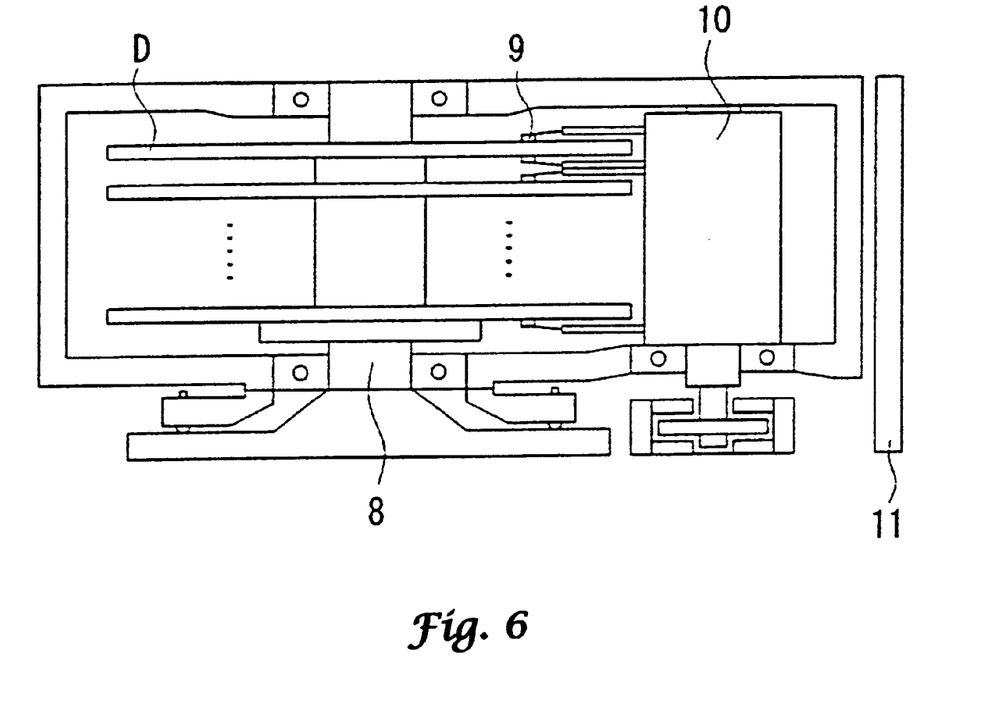
FIG. 6 is a partial cross-sectional view showing an embodiment of the magnetic recording and reproducing apparatus of the present invention.

FIG. 6 shows an embodiment of the magnetic recording and reproducing apparatus including the aforementioned magnetic recording medium. The apparatus includes a magnetic recording medium D having the aforementioned structure; a medium-driving section 8 which rotates the medium D; a magnetic head 9 which is employed for recording of data onto the medium 7 and for reproduction of the data therefrom; a head-driving section 10; and a recorded/reproduced-signal-processing system 11.

In the recorded/reproduced signal-processing-system 11, incoming external signals are processed and sent to the magnetic head 9, or reproduction signals from the head 9 are processed and output to the outside.

Since the magnetic recording and reproducing apparatus employs the magnetic recording medium D exhibiting excellent magnetic characteristics and glide height characteristics, high recording density can be attained.

The present invention will be described in further detail below using the Examples, which are not intended to limit the scope of the invention and should not be interpreted as doing so.

EXAMPLES

Example 1

The magnetic recording medium shown in FIG. 4 was produced as follows.

On a glass substrate 1 having an amorphous structure (outer diameter: 65 mm, inner diameter: 20 mm, thickness: 0.635 mm, average surface roughness (Ra): 0.3 nm), an amorphous metallic film 2 and a crystal-structure-regulating film 3 were formed through sputtering by use of a DC magnetron sputtering apparatus (Model 3010, product of ANELVA, Japan).

During film formation, the chamber of the sputtering apparatus was evacuated to $7 \times 10^{-6}$ Pa. Argon was used as a sputtering gas, and the gas pressure was 0.7 Pa during sputtering.

The surface of the disk—including the substrate 1, and the amorphous metallic film 2 (Cr35Ta (Ta content: 35 at %)) and the crystal-structure-regulating film 3 (Ni20P (P content: 20 at %)) which were formed on the substrate 1—was subjected to texturing by use of a texturing apparatus (product of EDC). During texturing, a portion in the vicinity of the surface of the film 3 (the portion having a thickness of about 10 nm) was scraped off. After completion of texturing, the average surface roughness (Ra) of the film 3 was 0.3 nm. Subsequently, the surface of the film 3 was washed with water, to remove residual abrasive grains.

Subsequently, a non-magnetic undercoat film 14, an intermediate film 13, and a magnetic film 15 were formed through a sputtering process including application of bias.

When a first undercoat layer 14a was formed, the bias voltage was set at 300 V.

Subsequently, a carbon protective film 6 (thickness: 4 nm) and a perfluoropolyether lubrication film 7 (thickness: 1.8 nm) were formed, and a tape varnish treatment was carried out, to produce a magnetic recording medium.

Examples 2 through 7

The procedure of Example 1 was repeated, except that the thickness of the amorphous metallic film 2 and/or the thickness of the crystal-structure-regulating film 3 were changed as shown in Table 1, to produce magnetic recording media.

Example 8

The procedure of Example 1 was repeated, except that the material of the amorphous metallic film 2 was changed as shown in Table 1, to produce a magnetic recording medium.

Comparative Example 1

The procedure of Example 1 was repeated, except that an aluminum substrate was used, to produce a magnetic recording medium as specified in Table 1.

Comparative Example 2

The procedure of Example 1 was repeated, except that an amorphous metallic film was not formed, to produce a magnetic recording medium as specified in Table 1.

The procedure of Example 1 was repeated, except that a Cr metallic film (thickness: 80 nm) was provided instead of an amorphous metallic film, to produce a magnetic recording medium as specified in Table 1.

Comparative Example 4

The procedure of Example 1 was repeated, except that a Cr metallic film (thickness: 10 nm) was provided instead of an amorphous metallic film, and the thickness of a crystal-structure-regulating film was controlled to 80 nm (after texturing), to produce a magnetic recording medium as specified in Table 1.

Examples 9 through 13

The procedure of Example 1 was repeated, except that crystal-structure-regulating films were formed from (Ni20P) 10Mo (P content: 20 at % and Mo content: 10 at %) (Example 9), Ni13P (P content: 13 at %) (Example 10), Ni27P (P content: 27 at %) (Example 11), Ni15P (P content: 15 at %) (Example 12), and Ni25P (P content: 25 at %) (Example 13), to produce magnetic recording media as specified in Table 1.

Examples 14 and 15

The procedure of Example 1 was repeated, except that crystal-structure-regulating films were subjected to texturing to attain average surface roughnesses (Ra) of 0.7 nm (Example 14) and 0.5 nm (Example 15), to produce magnetic recording media as specified in Table 1.

Comparative Examples 5 through 8

The procedure of Example 1 was repeated, except that the thickness of the amorphous metallic film and/or the thickness of the crystal-structure-regulating film were changed, to produce magnetic recording media.

The magnetic recording media of the aforementioned Examples and Comparative Examples were subjected to a glide test by use of BG tester (Model DS4300, product of Sony Tektronix, Japan). The glide test was carried out at a glide height of 0.4 micro inches. A magnetic recording medium in which at least one hit was generated was evaluated as having not passed the glide test. The ratio of magnetic recording media which passed the glide test is called the "BG yield."

Read-write conversion characteristics of the magnetic recording media which had passed the glide test were evaluated by use of a read/write analyzer (product of GUZIK, U.S.A.). In order to evaluate read-write conversion characteristics, SNR was measured at a noise level of 500 kFCI and an output level of 250 kFCI, by use of a complex-type thin film magnetic recording head containing a giant magnetoresistive (GMR) element at the reproduction section.

The test results are shown in Table 1.

TABLE 1-1

|  | Substrate | Amorphous metallic film (or metallic film) | | | Crystal-structure-regulating film | | | | Non-magnetic undercoat film | | | |
|---|---|---|---|---|---|---|---|---|---|---|---|---|
|  |  | | | | | Thickness (*1) | | Surface | First undercoat layer | | Second undercoat layer | |
|  |  | Composition | Structure | Thickness | Composition | Before tex | After Tex | roughness (Ra) | Composition | Thickness | Composition | Thickness |
| Ex. 1 | Glass | Cr35Ta | Amorphous | 80 | Ni20P | 20 | 10 | 0.3 | Cr | 8 | Cr20Mo | 20 |
| Ex. 2 | Glass | Cr35Ta | Amorphous | 30 | Ni20P | 60 | 50 | 0.3 | Cr | 8 | Cr20Mo | 20 |
| Ex. 3 | Glass | Cr35Ta | Amorphous | 50 | Ni20P | 50 | 40 | 0.3 | Cr | 8 | Cr20Mo | 20 |
| Ex. 4 | Glass | Cr35Ta | Amorphous | 60 | Ni20P | 30 | 20 | 0.3 | Cr | 8 | Cr20Mo | 20 |
| Ex. 5 | Glass | Cr35Ta | Amorphous | 100 | Ni20P | 20 | 10 | 0.3 | Cr | 8 | Cr20Mo | 20 |
| Ex. 6 | Glass | Cr35Ta | Amorphous | 60 | Ni20P | 60 | 50 | 0.3 | Cr | 8 | Cr20Mo | 20 |
| Ex. 7 | Glass | Cr35Ta | Amorphous | 150 | Ni20P | 20 | 10 | 0.3 | Cr | 8 | Cr20Mo | 20 |
| Ex. 8 | Glass | Cr30Si | Amorphous | 80 | Ni20P | 20 | 10 | 0.3 | Cr | 8 | Cr20Mo | 20 |
| Comp. Ex. 1 | Aluminum | — | — | — | Ni20P | (*3) | (*3) | 0.3 | Cr | 8 | Cr20Mo | 20 |
| Comp. Ex. 2 | Glass | — | — | — | Ni20P | 100 | 90 | 0.3 | Cr | 8 | Cr20Mo | 20 |
| Comp. Ex. 3 | Glass | Cr | Crystalline | 80 | Ni20P | 20 | 10 | 0.3 | Cr | 8 | Cr20Mo | 20 |
| Comp. Ex. 4 | Glass | Cr | Crystalline | 10 | Ni20P | 90 | 80 | 0.3 | Cr | 8 | Cr20Mo | 20 |

|  | Intermediate film | | Magnetic film | | | BG yield (%) | SNR (dB) | First undercoat layer orientation plane |
|---|---|---|---|---|---|---|---|---|
|  | | | Second magnetic layer | | First magnetic | | | |
|  | Composition | Thickness | Composition | Thickness | layer | | | |
| Ex. 1 | Co35Cr | 2 | Co22Cr12Pt6B | 8 | (*2) | 90 | 20.4 | 200 |
| Ex. 2 | Co35Cr | 2 | Co22Cr12Pt6B | 8 | (*2) | 83 | 20.3 | 200 |
| Ex. 3 | Co35Cr | 2 | Co22Cr12Pt6B | 8 | (*2) | 83 | 20.5 | 200 |
| Ex. 4 | Co35Cr | 2 | Co22Cr12Pt6B | 8 | (*2) | 88 | 20.1 | 200 |
| Ex. 5 | Co35Cr | 2 | Co22Cr12Pt6B | 8 | (*2) | 90 | 20.3 | 200 |
| Ex. 6 | Co35Cr | 2 | Co22Cr12Pt6B | 8 | (*2) | 83 | 20.4 | 200 |
| Ex. 7 | Co35Cr | 2 | Co22Cr12Pt6B | 8 | (*2) | 90 | 20.3 | 200 |
| Ex. 8 | Co35Cr | 2 | Co22Cr12Pt6B | 8 | (*2) | 90 | 20.5 | 200 |
| Comp. Ex. 1 | Co35Cr | 2 | Co22Cr12Pt6B | 8 | (*2) | 83 | 19.0 | 200 |
| Comp. Ex. 2 | Co35Cr | 2 | Co22Cr12Pt6B | 8 | (*2) | — | — | — |
| Comp. Ex. 3 | Co35Cr | 2 | Co22Cr12Pt6B | 8 | (*2) | 83 | 17.1 | 110 |
| Comp. Ex. 4 | Co35Cr | 2 | Co22Cr12Pt6B | 8 | (*2) | 10 | 19.6 | 200 |

TABLE 1-2

|  | Substrate | Amorphous metallic film (or metallic film) | | | Crystal-structure-regulating film | | | | Non-magnetic undercoat film | | | |
|---|---|---|---|---|---|---|---|---|---|---|---|---|
|  |  | | | | | Thickness (*1) | | Surface | First undercoat layer | | Second undercoat layer | |
|  |  | Composition | Structure | Thickness | Composition | Before tex | After Tex | roughness (Ra) | Composition | Thickness | Composition | Thickness |
| Ex. 9 | Glass | Cr35Ta | Amorphous | 80 | (*4) | 20 | 10 | 0.3 | Cr | 8 | Cr20Mo | 20 |
| Ex. 10 | Glass | Cr35Ta | Amorphous | 80 | Ni13P | 20 | 10 | 0.3 | Cr | 8 | Cr20Mo | 20 |
| Ex. 11 | Glass | Cr35Ta | Amorphous | 80 | Ni27P | 20 | 10 | 0.3 | Cr | 8 | Cr20Mo | 20 |
| Ex. 12 | Glass | Cr35Ta | Amorphous | 80 | Ni15P | 20 | 10 | 0.3 | Cr | 8 | Cr20Mo | 20 |
| Ex. 13 | Glass | Cr35Ta | Amorphous | 80 | Ni25P | 20 | 10 | 0.3 | Cr | 8 | Cr20Mo | 20 |
| Ex. 14 | Glass | Cr35Ta | Amorphous | 80 | Ni20P | 20 | 10 | 0.7 | Cr | 8 | Cr20Mo | 20 |
| Ex. 15 | Glass | Cr35Ta | Amorphous | 80 | Ni20P | 20 | 10 | 0.5 | Cr | 8 | Cr20Mo | 20 |
| Comp. Ex. 5 | Glass | Cr35Ta | Amorphous | 20 | Ni20P | 80 | 70 | 0.3 | Cr | 8 | Cr20Mo | 20 |
| Comp. Ex. 6 | Glass | Cr35Ta | Amorphous | 250 | Ni20P | 80 | 70 | 0.3 | Cr | 8 | Cr20Mo | 20 |
| Comp. Ex. 7 | Glass | Cr35Ta | Amorphous | 20 | Ni20P | 10 | 0 | 0.3 | Cr | 8 | Cr20Mo | 20 |
| Comp. Ex. 8 | Glass | Cr35Ta | Amorphous | 250 | Ni20P | 10 | 0 | 0.3 | Cr | 8 | Cr20Mo | 20 |

TABLE 1-2-continued

| | Intermediate film | | Magnetic film | | | BG yield (%) | SNR (dB) | First undercoat layer orientation plane |
| | | | Second magnetic layer | | First magnetic layer | | | |
| | Composition | Thickness | Composition | Thickness | | | | |
|---|---|---|---|---|---|---|---|---|
| Ex. 9 | Co35Cr | 2 | Co22Cr12Pt6B | 8 | (*2 | 92 | 19.2 | 200 |
| Ex. 10 | Co35Cr | 2 | Co22Cr12Pt6B | 8 | (*2 | 85 | 19.0 | 200 |
| Ex. 11 | Co35Cr | 2 | Co22Cr12Pt6B | 8 | (*2 | 85 | 19.0 | 200 |
| Ex. 12 | Co35Cr | 2 | Co22Cr12Pt6B | 8 | (*2 | 90 | 19.5 | 200 |
| Ex. 13 | Co35Cr | 2 | Co22Cr12Pt6B | 8 | (*2 | 90 | 19.5 | 200 |
| Ex. 14 | Co35Cr | 2 | Co22Cr12Pt6B | 8 | (*2 | 83 | 20.1 | 200 |
| Ex. 15 | Co35Cr | 2 | Co22Cr12Pt6B | 8 | (*2 | 85 | 20.1 | 200 |
| Comp. Ex. 5 | Co35Cr | 2 | Co22Cr12Pt6B | 8 | (*2 | 40 | 20.2 | 200 |
| Comp. Ex. 6 | Co35Cr | 2 | Co22Cr12Pt6B | 8 | (*2 | 30 | 20.1 | 200 |
| Comp. Ex. 7 | Co35Cr | 2 | Co22Cr12Pt6B | 8 | (*2 | 90 | 16.4 | 200 |
| Comp. Ex. 8 | Co35Cr | 2 | Co22Cr12Pt6B | 8 | (*2 | 85 | 16.3 | 200 |

(*1: "Before tex" and "After tex" refer to the thickness of the crystal-structure regulating film before and after texturing, respectively.
(*2: Co14Cr8Pt8B (thickness: 4 nm).
(*3: about 10 μm.
(*4: (Ni20P)10Mo
In Comparative Example 1, the crystal-structure-regulating film was formed through plating.
In Comparative Example 2, the crystal-structure-regulating film was exfoliated, and BG yield and SNR could not be measured.
Unit of thickness and average surface roughness (Ra): nm As can be seen from Table 1, when the Cr crystalline metallic film is provided between the substrate and the crystal-structure-regulating film, and the thickness of the metallic film is increased, the crystal orientation plane of the first undercoat layer of the non-magnetic undercoat film assumes a (110) plane, and noise characteristics are deteriorated (Comparative Example 3).

In contrast, the results show that, when the CrTa amorphous metallic film 2 having an amorphous structure is provided, even when the thickness of the amorphous metallic film is increased, the crystal orientation plane of the first undercoat layer assumes a (200) plane, and excellent noise characteristics can be obtained (Example 1).

When the Cr crystalline metallic film is provided, and the thickness of metallic film is reduced, the thickness of the crystal-structure-regulating film must be increased in consideration of application of bias. The results show that, in this case, BG yield is impaired (Comparative Example 4).

The results also show that, when the crystal-structure-regulating film is formed from an NiP alloy containing Mo in order to enhance the hardness of the film, high BG yield is obtained (Example 9).

The results also show that, as compared with the case in which the P content of an NiP-based alloy constituting the crystal-structure-regulating film falls outside the range of 15–25 at %, when the P content is within the above range of 15–25 at %, more excellent noise characteristics can be obtained (Examples 1, and 10 through 13).

In addition, the results show that, as compared with the case in which the average surface roughness (Ra) of the crystal-structure-regulating film exceeds 0.5 nm, when the average surface roughness (Ra) is 0.5 nm or less, more excellent BG yield can be obtained (Examples 14 and 15).

Further, the results show that, even when the amorphous metallic film is provided, when the thickness of the crystal-structure-regulating film exceeds 50 nm, BG yield is impaired (Comparative Example 5).

Moreover, the results show that, in the case in which the amorphous metallic film is provided, even when the thickness of the amorphous metallic film is increased, noise characteristics are not deteriorated, and the film does not affect the crystallinity of the non-magnetic undercoat film (Comparative Example 6).

The results also show that, when the total thickness of the amorphous metallic film and the crystal-structure-regulating film is less than 60 nm, application of bias becomes difficult during sputtering, resulting in deterioration of noise characteristics (Comparative Example 7).

The results also show that, when the crystal-structure-regulating film is eliminated through texturing, the effect of the film is not obtained, resulting in deterioration of noise characteristics (Comparative Example 8).

Since the magnetic recording medium of the present invention includes an amorphous metallic film provided between a non-metallic substrate and a crystal-structure-regulating film, impairment of the crystal structure of a non-magnetic undercoat film can be prevented.

In addition, since the total thickness of the amorphous metallic film and the crystal-structure-regulating film is determined to be 60 nm or more, during formation of the non-magnetic undercoat film, insufficient application of bias to the disk on which the undercoat film is to be formed can be prevented.

Therefore, the crystal orientation of the non-magnetic undercoat film and a magnetic film can be enhanced, and excellent magnetic characteristics (e.g., noise characteristics) can be obtained.

Since the thickness of the crystal-structure-regulating film is determined to be 50 nm or less, formation of burrs or abrasive grains remaining on the film during texturing can be prevented, the surface evenness of the film can be enhanced, and glide height characteristics can be enhanced.

Therefore, the magnetic recording medium of the present invention exhibits excellent magnetic characteristics, such as noise characteristics, and excellent glide height characteristics.

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising, in order, a non-metallic substrate; an amorphous metallic film having an amorphous structure; a crystal-structure-regulating film of NiP-based alloy; and a non-magnetic undercoat film and a magnetic film; and wherein the crystal-structure-regulating film has a film thickness of 50 nm or less, and a total film thickness of the amorphous metallic film and the crystal-structure-regulating film is at least 60 nm, and wherein the amorphous metallic film is formed from a CrTa-based alloy or a CrSi-based alloy.

2. A magnetic recording medium according to claim 1, wherein the crystal-structure-regulating film has an average surface roughness (Ra) of 0.5 nm or less.

3. A magnetic recording medium according to claim 1, wherein the crystal-structure-regulating film has an average surface roughness (Ra) of 0.05–0.5 nm.

4. A magnetic recording medium according to claim 1, wherein the NiP-based alloy of the crystal-structure-regulating film has a P content of 15–25 at%.

5. A process for producing a magnetic recording medium, which comprises forming, on a non-metallic substrate, an amorphous metallic film, a crystal-structure-regulating film, a non-magnetic undercoat film, and a magnetic film, in order, and wherein the crystal-structure-regulating film has a film thickness of 50 nm or less, the total film thickness of the amorphous metallic film and the crystal-structure-regulating film is at least 60 nm, and the amorphous metallic film is formed from a CrTa-based alloy or a CrSi-based alloy.

6. A magnetic recording and reproducing apparatus comprising a magnetic recording medium and a magnetic head for recording data onto the medium and reproducing the data therefrom, wherein the magnetic recording medium comprises, in order, a non-metallic substrate; an amorphous metallic film having an amorphous structure; a crystal-structure-regulating film of NiP-based alloy; and a non-magnetic undercoat film and a magnetic film, wherein the crystal-structure-regulating film has a film thickness of 50 nm or less, a total film thickness of the amorphous metallic film and the crystal-structure-regulating film is at least 60 nm and the amorphous metallic film is formed from a CrTa-based alloy or a CrSi-based alloy.

7. A medium substrate for a magnetic recording medium, comprising a non-metallic substrate; an amorphous metallic film having an amorphous structure on the non-metallic substrate; and a crystal-structure-regulating film of NiP-based alloy on the amorphous metallic film, wherein the crystal-structure-regulating film has a film thickness of 50 nm or less, a total film thickness of the amorphous metallic film and the crystal-structure-regulating film is at least 60 nm, and the amorphous metallic film is formed from a CrTa-based alloy or a CrSi-based alloy.

* * * * *